United States Patent [19]

Niimura et al.

[11] 4,343,018
[45] Aug. 3, 1982

[54] CHROMINANCE SIGNAL PROCESSING CIRCUIT

[75] Inventors: Tsutomu Niimura, Hiratsuka; Kyoichi Murakami, Chigasaki; Akira Yamakoshi, Miyori, all of Japan

[73] Assignee: Sony Corporation, Tokyo, Japan

[21] Appl. No.: 208,193

[22] Filed: Nov. 19, 1980

[30] Foreign Application Priority Data

Nov. 26, 1979 [JP] Japan .................................. 54/153193

[51] Int. Cl.³ ............................................ H04N 9/535
[52] U.S. Cl. ........................................ 358/28; 358/27
[58] Field of Search .................................... 358/27, 28

[56] References Cited

FOREIGN PATENT DOCUMENTS 52-33425 3/1977 Japan ..................................... 358/28

Primary Examiner—John C. Martin
Attorney, Agent, or Firm—Lewis H. Eslinger; Alvin Sinderbrand

[57] ABSTRACT

A chrominance signal processing circuit for generating a gain-controlled chrominance signal carrier and a phase-controlled burst signal is provided with a first differential amplifier receiving a chrominance signal carrier and having a first constant current source, a second differential amplifier receiving an output signal of the first differential amplifier, a phase control circuit connected to the output of the second differential amplifier, the second differential amplifier receiving its bias current from a second constant current source during a chroma interval and from a third constant current source during a burst interval, the ratio of the currents of the first and second constant current sources being controlled for controlling the gain of the chrominance signal, and the output of the second differential amplifier being controlled at least during the burst interval, for controlling the phase of the burst signal.

8 Claims, 5 Drawing Figures

CHROMINANCE SIGNAL PROCESSING CIRCUIT

BACKGROUND OF THE INVENTION

1. Field of the Invention

The present invention relates to a chrominance signal processing circuit of a color television receiver.

2. Description of the Prior Art

A chrominance signal processing circuit usually performs automatic chroma control (ACC), picture control, color control and the like. In the prior art, a number of separate gain control amplifiers are used in a multi-stage manner to perform the foregoing control operations. The resulting circuit construction is relatively large and, when it is constructed as an integrated circuit, the number of pins led out from the integrated circuit device is undesirably increased. Further, in the prior art, hue control is carried out by changing the phase of a continuous wave or injection carrier for color demodulation, and a reactance element for effecting the phase shift must be provided outside the integrated circuit and results in a relatively complicated construction.

OBJECTS AND SUMMARY OF THE INVENTION

Accordingly, it is an object of this invention to provide a chrominance signal processing circuit which is free of the above-mentioned drawbacks of the prior art.

More specifically, it is an object of this invention to provide a chrominance signal processing circuit having a circuit construction which is simplified by using only a gain control circuit consisting of two differential amplifiers for effecting automatic chroma control, picture control, color control, and the like.

It is another object of this invention to provide a chrominance signal processing circuit, as aforesaid, and which has its circuit construction further simplified by providing a hue control arrangement associated with the above-mentioned gain control circuit.

According to an aspect of this invention, a chrominance signal processing circuit for generating a gain-controlled chrominance signal carrier and a phase-controlled burst signal has a first differential amplifier receiving a chrominance signal carrier and having a first constant current source, and a second differential amplifier receiving an output signal of the first differential amplifier and having a phase control circuit connected to an output of the second differential amplifier. This second differential amplifier is supplied with its bias current from a second constant current source during the chroma interval and from a third constant current source during the burst interval.

The ratio of the currents of the first and second constant current sources is controlled for effecting color control, and the output of the second differential amplifier is controlled at least during the burst interval, for effecting hue control.

The above, and other objects, features and advantages of the invention will be apparent from the following detailed description which is to be read in conjunction with the accompanying drawings.

DESCRIPTION OF THE PREFERRED EMBODIMENT

Figure 1:
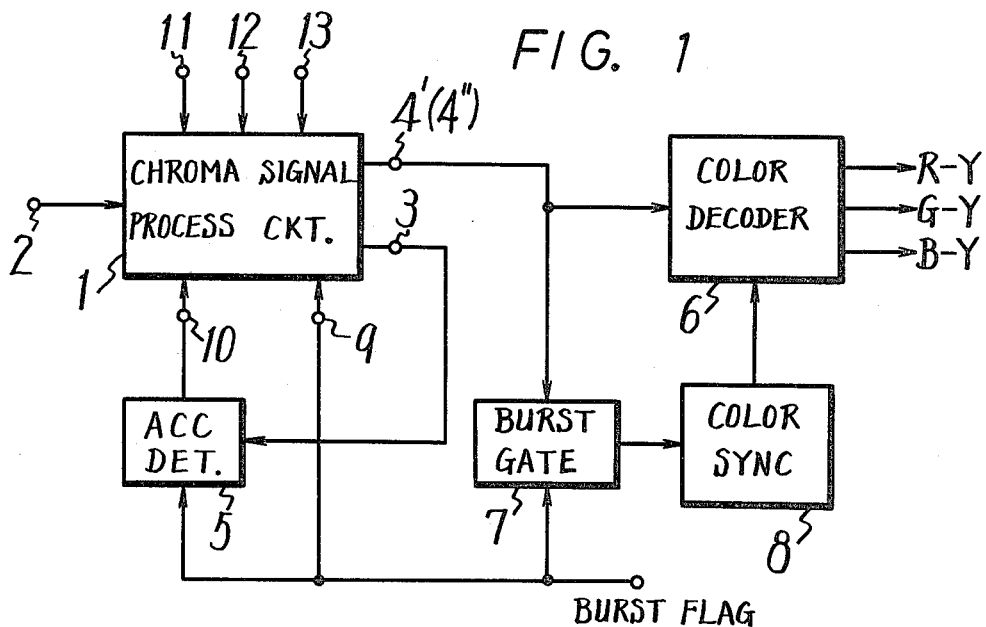
FIG. 1 is a block diagram of a chrominance signal system of a color television receiver to which this invention may be applied.

Referring to the drawings in detail, and initially to FIG. 1 thereof, it will be seen that, in a chrominance signal system of a color television receiver to which this invention may be applied, a chrominance signal is supplied to a processing circuit 1 through an input terminal 2. The chrominance signal appearing at an output terminal 3 of chrominance signal processing circuit 1 is fed to an automatic chroma control (ACC) detecting circuit 5, and a chrominance signal appearing at another output terminal 4 of circuit 1 is fed to a color decoder 6 and to a burst gate 7. A burst signal derived from burst gate 7 is fed to a color synchronizing circuit 8 to produce a reference sub-carrier or an injection carrier, which is then fed to the color decoder 6 to be used for color demodulation. A luminance signal (not shown) is also suitably applied to decoder 6 so that three color difference signals $R-Y$, $G-Y$ and $B-Y$ can be derived from the color decoder 6. A burst flag suitably obtained by delaying the phase of a horizontal synchronizing signal is applied to ACC detecting circuit 5, burst gate 7 and a terminal 9 of chrominance signal processing circuit 1. Chrominance signal processing circuit 1 is further provided with a terminal 10 to which is applied an ACC signal from ACC detecting circuit 5, a terminal 11 to which is applied a picture control signal, a terminal 12 receiving a color control signal, and a terminal 13 receiving a hue control signal. These control signals are respective DC voltages and each suitably generated by a volume control (not shown) or the like.

Figure 2:
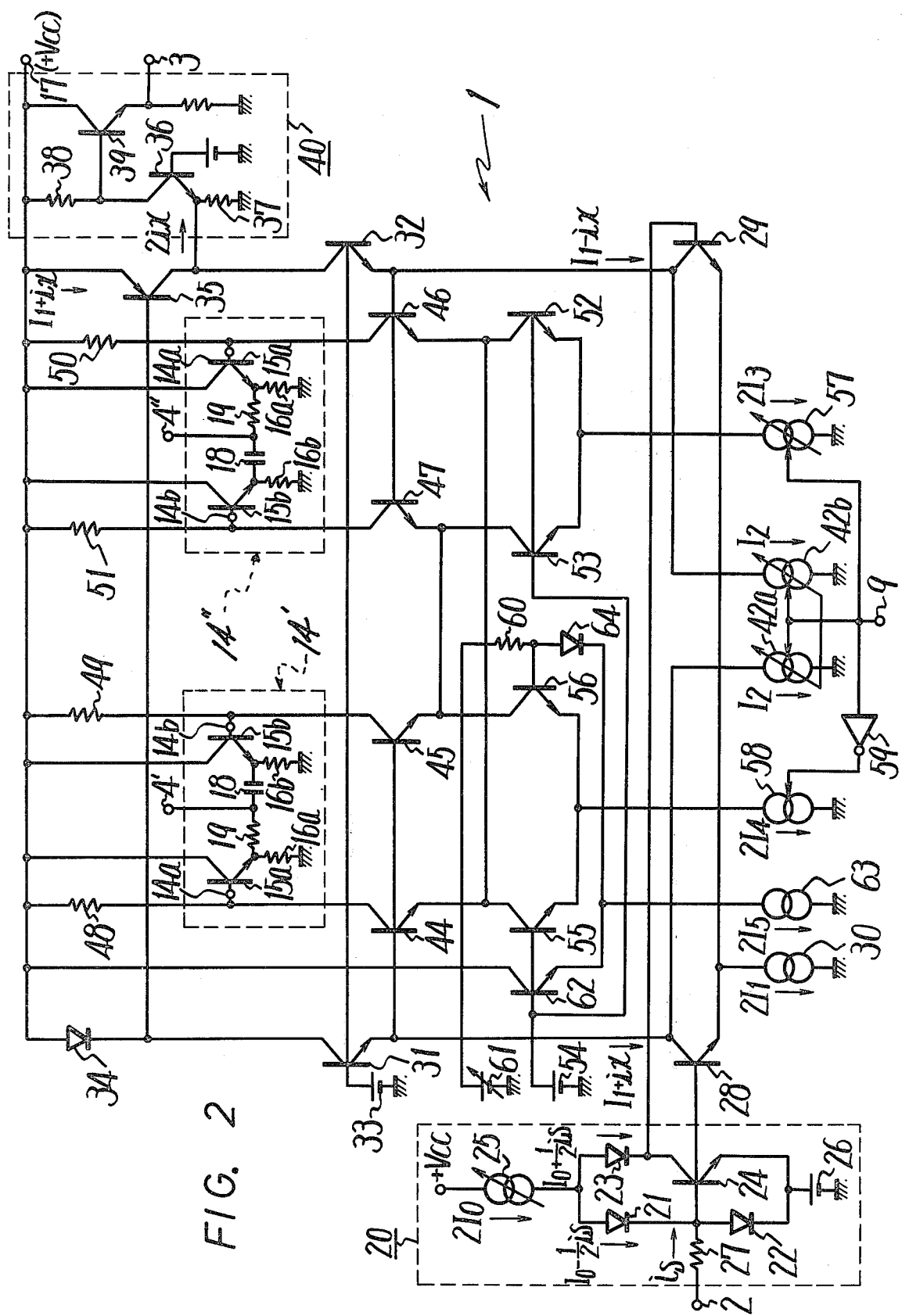
FIG. 2 is a connection diagram showing one embodiment of a chrominance signal processing circuit according to this invention.

Referring now to FIG. 2, it will be seen that, in a chrominance signal processing circuit 1 according to an embodiment of this invention, an output terminal 4' or 4" is led out from each of two phase control circuits 14' or 14" indicated in broken lines, and output terminal 3 is led out from an output circuit 40 similarly shown in broken lines.

Figure 3:
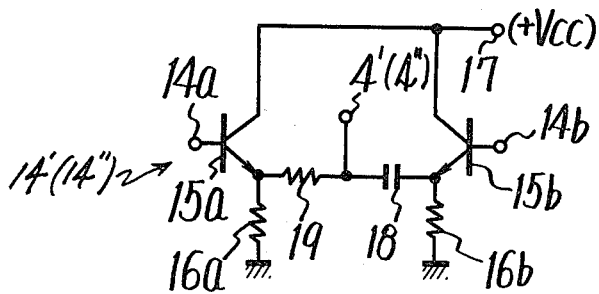
FIG. 3 is a connection diagram of one of the phase control circuits used in the chrominance signal processing circuit of FIG. 2.

One of the phase control circuits 14' and 14" is separately shown in FIG. 3, in which 14a and 14b indicate input terminals to which are applied input signals having the same phase and differentially variable levels. The input terminals 14a and 14b are respectively connected to the bases of transistors 15a and 15b. The transistors 15a and 15b have their emitters grounded through resistors 16a and 16b, respectively, while the collectors thereof are connected in common to a voltage source or terminal 17 receiving a supply voltage $+Vcc$, so that transistors 15a and 15b are of the emitter-follower type. A series circuit of a capacitor 18 and a resistor 19 is connected between the emitters of transistors 15a and 15b and the connection point between capacitor 18 and resistor 19 is connected to the respective output terminal 4' or 4".

Figure 4:
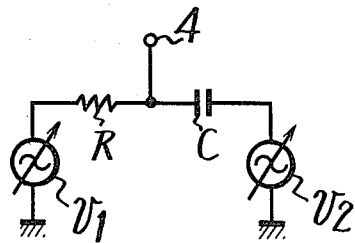
FIG. 4 is an equivalent circuit to which reference will be made in explaining the phase control circuit.

If the capacity of capacitor 18 is identified as C and the resistance of resistor 19 as R, an equivalent circuit of the phase control circuit 14' or 14" will be as shown in FIG. 4, in which input voltage sources $v_1$ and $v_2$ respectively correspond to the emitter-follower transistors 15a and 15b. While one input voltage $v_1$ changes from 0 to v, the other input voltage $v_2$ changes from v to 0. Now, if $v_1+v_2=\frac{1}{2}v$ is assumed, the resistor R and the capacitor C have no current flow therethrough and an output voltage $v_3(=\frac{1}{2}v)$ is derived from output terminal 4' or 4''. When $v_1=v$ and $v_2=0$, the output voltage $v_3$ is expressed as follows:

$$v_3 = \frac{\frac{1}{j\omega C}}{R + \frac{1}{j\omega C}} \cdot v = \frac{\frac{1}{j\omega C}\left(R - \frac{1}{j\omega C}\right)}{\left(R + \frac{1}{j\omega C}\right)\left(R - \frac{1}{j\omega C}\right)} \cdot v \quad (1)$$

$$v_3 = \frac{\frac{1}{\omega^2 C^2} - j\frac{R}{\omega C}}{R^2 + \frac{1}{\omega^2 C^2}} \cdot v$$

In this case, if values for R and C are selected so that $R=1/\omega C$, the following equation is obtained.

$$v_3=[(1-j)/2]v \quad (2)$$

Thus, the output voltage $v_3$ delayed in phase by 45 degrees in respect to the input voltage can be obtained. Further, when $v_1=0$ and $v_2=v$, the output voltage $v_3$ is expressed as follows:

$$v_3 = \frac{R}{R + \frac{1}{j\omega C}} \cdot v = \frac{R\left(R - \frac{1}{j\omega C}\right)}{\left(R + \frac{1}{j\omega C}\right)\left(R - \frac{1}{j\omega C}\right)} \cdot$$

$$v = \frac{R^2 + j\frac{R}{\omega C}}{R + \frac{1}{\omega^2 C^2}} \cdot v$$

In this case, since $R=1/\omega C$, the following equation can be similarly obtained:

$$v_3=[(1+j)/2]\cdot v \quad (3)$$

Figure 5:
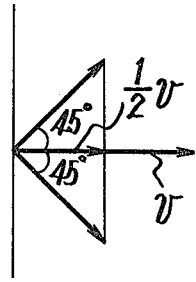
FIG. 5 is a vector diagram to which reference will be made in explaining the phase control circuit.

In other words, the output voltage $v_3$ advanced in phase by 45 degrees in respect to the input voltage can be obtained. Accordingly, as shown in FIG. 5, there can be generated an output voltage having a locus which is parallel with the ordinate and varying over an angular range of ±45 degrees relative to the abscissa (input voltage).

Returning to FIG. 2, a chrominance signal including a burst signal is shown to be supplied through input terminal 2 to a signal converting circuit 20 where it is converted into two differential signal currents $I_0-\frac{1}{2}i_s$ and $I_0+\frac{1}{2}i_s$. More particularly, in signal converting circuit 20, a series connection of diodes 21 and 22 and a series connection of a diode 23 and the collector-emitter path of a transistor 24 are connected in parallel between a constant current source 25, providing a current of $2I_0$, and a bias voltage source 26. The connection point of diodes 21 and 22 is connected to the base of transistor 24 and also to input terminal 2 through a resistor 27.

With signal converting circuit 20 having the foregoing construction, the base of transistor 24 is connected to the base of a transistor 28, and the collector of transistor 24 is connected to the base of another transistor 29. The transistors 28 and 29 are associated with each other to form a differential amplifier. The emitters of transistors 28 and 29 are connected in common to a constant current source 30 providing a current of $2I_1$, and the collectors of transistors 28 and 29 are respectively connected to the emitters of transistors 31 and 32. The bases of transistors 31 and 32 are connected to a DC voltage source 33 of a predetermined value, and the collectors of transistors 31 and 32 are respectively connected to a diode 34 and to the collector of a transistor 35 which form a current mirror circuit. A chrominance signal (including a burst signal) which appears at the collector of transistor 35 is derived from the output terminal 3 through output circuit 40. Such output circuit 40 is shown to be composed of a grounded-base type transistor 36, a constant current source resistor 37, a load resistor 38, and an emitter-follower type transistor 39.

The collectors of transistors 28 and 29 are also connected to constant current sources 42a and 42b, respectively. These constant current sources 42a and 42b are adapted to have the same constant current $I_2$ flow therethrough. Such current $I_2$ is controlled by the picture control signal, and the current source 42a and 42b are turned OFF during the burst interval by a switching signal, that is, the burst flag applied to terminal 9. The picture control signal is relied upon to change the amplitudes of both the luminance signal and the chrominance signal, and it is the color control signal which changes the amplitude of the chrominance signal alone. Though not shown in the drawings, a gain control circuit is also provided in a luminance signal system and is also supplied with the picture control signal.

The output terminal 3 of output circuit 40 is connected to the ACC detecting circuit 5 shown in FIG. 1, and the constant current $2I_0$ of source 25 in signal converting circuit 20 is controlled in level by an ACC signal corresponding to the peak value of the burst signal and being generated by ACC detecting circuit 5. The signal converting circuit 20 is associated with the differential amplifier consisting of transistors 28 and 29 to form a gain control or ACC circuit whose gain is proportional to $I_1/I_0$.

In signal converting circuit 20, when a signal current $i_s$ is supplied to the connection point between diodes 21 and 22, as shown in FIG. 2, the currents $I_0-\frac{1}{2}i_s$ and $I_0+\frac{1}{2}i_s$ flow through diodes 21 and 23, respectively. If it is now assumed that the collector currents of transistors 28 and 29 are respectively varied to $I_1+i_x$ and $I_1-i_x$ in response to the signal current $i_s$, then, in the current mirror circuit consisting of diode 34 and transistor 35, the emitter current of transistor 35 also becomes $I_1+i_x$ and an output current of $2i_x$ is supplied to output circuit 40. The junction voltage drops $V_{BE21}$ and $V_{BE23}$ of diodes 21 and 23 and the base-emitter voltage drops $V_{BE28}$ and $V_{BE29}$ of transistors 28 and 29 are respectively expressed as follows:

$$V_{BE21} = \frac{kT}{q} l_n \frac{(I_0 - \frac{1}{2} i_s)}{I_S} \quad (4a)$$

$$V_{BE23} = \frac{kT}{q} l_n \frac{(I_0 + \frac{1}{2} i_s)}{I_S} \quad (4b)$$

$$V_{BE28} = \frac{kT}{q} l_n \frac{(I_1 + i_x)}{I_S} \quad (4c)$$

-continued $$V_{BE29} = \frac{kT}{q} l_n \frac{(I_1 - i_x)}{I_X} \quad (4d)$$

in which $I_S$ is a reversed saturation current, q is an electric charge of an electron, k is a Boltzmenn's constant, and T is an absolute temperature. Since the relation of $V_{BE21} + V_{BE28} = V_{BE23} + V_{BE29}$ is established, the following results are obtained from the above expressions (4a) to (4d):

$$\frac{kT}{q} \left( l_n \frac{(I_0 - \frac{1}{2} i_s)}{I_S} + l_n \frac{(I_1 + i_x)}{I_S} \right) = \quad (5)$$

$$\frac{kT}{q} \left( l_n \frac{(I_0 + \frac{1}{2} i_s)}{I_S} + l_n \frac{(I_1 - i_x)}{I_X} \right)$$

$$(I_0 - \tfrac{1}{2} i_x)(I_1 + i_x) = (I_0 + \tfrac{1}{2} i_s)(I_1 - I_x)$$

$$i_x = \frac{I_1}{2I_0} i_s$$

Therefore, the signal component which is derived from the collectors of transistors 28 and 29 and supplied to output circuit 40 is proportional to $I_1/I_0$.

The emitter of transistor 31 is connected to the bases of transistors 44 and 45 which have their collectors connected to input terminals 14a and 14b of phase control circuit 14' and, through resistors 48 and 49, respectively, to the voltage source terminal 17. Similarly, the emitter of transistor 32 is connected to the bases of transistors 46 and 47 which have their collectors connected to input terminals 14a and 14b of phase control circuit 14" and, through resistors 50 and 51, to voltage source terminal 17. Signals of the same phase appear at the collectors of transistors 44 and 45 and, at the collectors of transistors 46 and 47, there also appear signals of the same phase which is opposite to the phase of the signals at the collectors of transistors 44 and 45. Accordingly, differential signals are obtained at the output terminals 4' and 4" of phase control circuits 14' and 14", respectively. The chrominance signal including the burst signal from each of output terminals 4' and 4" is supplied to burst gate 7 and color decoder 6, as mentioned in connection with FIG. 1.

The transistors 44 and 46, whose collectors are connected to input terminals 14a of phase control circuits 14' and 14", have their emitters connected to each other, while the transistors 45 and 47, whose collectors are connected to the other input terminals 14b of phase control circuits 14' and 14", have their emitters connected to each other, thereby forming two differential amplifiers. These two differential amplifiers are associated with the differential amplifier consisting of transistors 28 and 29 to form a gain control circuit. The common emitter connection points of the transistors 44 and 46 and of the transistors 45 and 47 are connected to the collectors of transistors 52 and 55 and to the collectors of transistors 53 and 56, respectively. The bases of transistors 52 and 53 are connected in common to a DC voltage source 54 and the emitters of transistors 52 and 53 are connected in common to a constant current source 57 having a current of $2I_3$. The constant current source 57 is turned OFF during the burst interval by the switching signal from terminal 9 in the same way as the constant current sources 42a and 42b, and the amplitude of the constant current of $2I_3$ of source 57 is controlled by the color control signal.

The emitters of transistors 55 and 56 are connected in common to a constant current source 58 having a current of $2I_4$. This constant current source 58 has applied thereto an inverted switching signal through an inverter 59 from terminal 9 so as to be turned ON only during the burst interval. The base of transistor 55 is connected to voltage source 54 while the base of transistor 56 is connected through a resistor 60 to a variable voltage source 61. Further, voltage source 54 is connected through the base-emitter junction of a transistor 62 to a constant current source 63 having a current of $2I_5$, and variable voltage source 61 is connected through resistor 60 and a diode 64 to constant current source 63. The variable voltage source 61 is controllable by the hue control signal applied to terminal 13 on FIG. 1 for varying the value of the voltage of source 61.

During the chroma interval, constant current source 58 is turned OFF and constant current source 57 is turned ON, so that a constant current $I_3$ is supplied to each of transistors 52 and 53 and, accordingly, the differential amplifier consisting of transistors 44 and 46 and the differential amplifier consisting of transistors 45 and 47 are each operated by the respective constant current $I_3$. Accordingly, at the collectors of transistors 44 and 45, there appear the chrominance signals which are the same in phase and level, and, at the collectors of transistors 46 and 47, there appear the chrominance signals which are the same in phase and level but opposite in phase to the signals appearing at the collectors of transistors 44 and 45. Therefore, phase control circuits 14' and 14" provide the chrominance signals which are respectively the same in phase as the original and opposite in phase thereto, and these chrominance signals are supplied to the color decoder or demodulator circuit 6. During the chroma interval, the gain of the chrominance signal provided with gain control by the ACC signal will be proportional to $I_1/I_0 \cdot [I_3/(I_{1+I2})]$. In other words, the amplitude of constant current $I_0$ is changed according to the ACC signal to carry out the ACC operation, the amplitude of constant current $I_2$ is varied to carry out the picture control, and the amplitude of constant current $I_3$ is varied to carry out the color control. The gain control operation in the case of picture control or color control is the same as has been described for automatic chroma control (ACC).

During the burst interval, constant current source 57 is turned OFF and constant current source 58 is turned ON, as mentioned above. The variable voltage source 61 is controlled by the hue control signal thereby to change the distribution or ratio of the currents flowing through transistor 62 and diode 64. Thus, the distribution or ratio of the currents flowing through transistors 55 and 56 is also changed. As a result, the signal current flowing through transistors 44 and 46 and the signal current flowing through transistors 45 and 47 are differentially changed in level. As described above, from each of output terminal 4' and 4" of phase control circuits 14' and 14" there is derived a burst signal whose phase is changed according to the signal levels fed to the respective input terminals 14a and 14b thereof. This burst signal is fed through burst gate 7 to color synchronizing circuit 8 to derive therefrom the injection carrier corresponding in phase with the burst signal. The injection carrier is fed to color decoder 6 to carry out therein the color demodulation so that the hue control can be performed in response to phase changes of the injection carrier. The gain during the burst interval is proportional to $(I_1/I_0) \cdot (I_4/I_1)$.

It will be understood from the above description of the illustrated embodiment that the first differential amplifier consisting of transistors 28 and 29 and the second differential amplifier consisting of transistors 44 and 46 (or 45 and 47) are combined to form the gain control circuit for controlling the amplitude of the chrominance signal. Since phase control circuits 14' and 14" are connected at the output side of the second differential amplifier, and the constant current sources 57 and 58 of the second differential amplifier are changed over between the interval of the chrominance signal and the interval of the burst signal, only the burst signal may be phase-shifted by the hue control signal.

As earlier noted, the amplitudes of both the luminance and chrominance of the reproduced picture are varied in accordance with the picture control signal, whereas only the amplitude of the chrominance is varied in accordance with the color control signal. In order to ensure that a reproduced picture will still appear on the screen and that color control will still be possible in the direction for decreasing the chrominance of the reproduced picture at the lower end of the range of picture control, such range of picture control is limited so that, at the lower end thereof, the amplifiers for the luminance and chrominance signals, respectively, have finite gains greater than zero. Further, when a relatively weak color video signal is being received and a complete color killer operation is not effected, it is more desirable to view the reproduced picture in black and white, rather than as a noisy color picture. Therefore, the range of color control should be sufficient to vary the gain of the chrominance amplifier from zero to a maximum value. In other words, the gain of the chrominance amplifier can be reduced to zero in response to the color control signal so that a black and white picture can be viewed when receiving a weak color video signal.

The foregoing requirements are satisfied by effecting picture control by varying the constant current sources 42a and 42b connected to the collectors of transistors 28 and 29 constituting the first differential amplifier and by effecting color control by varying the constant current source 57 connected to the emitters of transistors 44, 46 and 45, 47 constituting the second differential amplifier. Thus, in accordance with this invention, the circuit construction can be greatly simplified as compared with the construction where individual gain control circuits are connected in a multi-stage manner to respectively provide for color control, picture control and the like. Further, since the phase of the injection carrier wave is not shifted for effecting hue control in accordance with this invention, it is not necessary to connect an external phase-shifting reactance circuit to the integrated circuit of the color synchronizing circuit. In addition, each phase control circuit 14' or 14" may satisfy the relation $R = 1/\omega C$ through the use of a capacitor 18 of small capacity which can be planted on the integrated circuit. Further, since the circuit according to this invention is constituted by differential amplifiers, it is little affected by noise generated through a voltage source and the connection to ground. Moreover, since the gain controls are all performed by varying respective constant currents, the frequency characteristics of the circuit according to this invention are good and the distortion factor thereof can be lowered.

In effecting gain control by changing the constant current $I_3$, the DC levels of the output signal appearing a the collectors of transistors 44, 45, 46 and 47 are also varied, so that a circuit compensating for such variation in DC level may be provided. For example, it is possible to use for that purpose a compensating circuit including a resistor through which the constant current $I_3$ is passed to generate a voltage drop, and then changing the voltage value of the collector voltage source 17 for transistors 44 to 47 in accordance with such voltage drop. Further, the constant current sources may be formed by resistors having high resistance values.

Having described a specific embodiment of the invention with reference to the accompanying drawings, it is to be understood that the invention is not limited to that precise embodiment, and that many modifications and variations may be effected therein by one skilled in the art without departing from the scope or spirit of the invention which is intended to be defined by the appended claims.

We claim as our invention:

1. A chrominance signal processing circuit for generating a gain-controlled chrominance carrier signal and a phase-controlled burst signal, comprising:

first differential amplifier means supplied with a chrominance carrier signal and a burst signal in respective intervals and having a first constant current source;

second differential amplifier means supplied with an output signal of said first differential amplifier means;

phase control circuit means connected to outputs of said second differential amplifier means for providing therefrom said gain-controlled chrominance carrier signal and said phase-controlled burst signal;

a second constant current source for supplying a bias current to said second differential amplifier means during each said interval of the chrominance carrier signal;

a third constant current source for supplying a bias current to said second differential amplifier means during each said interval of the burst signal;

gain controlling means for controlling the ratio of the currents of said first and second constant current sources, whereby to control the gain of said chrominance carrier signal from said phase control circuit means; and phase controlling means for controlling an output signal of said second differential amplifier means at least during each said interval of the burst signal, whereby to control the phase of the burst signal from said phase control circuit means.

2. A chrominance signal processing circuit according to claim 1; wherein two devices, each having a P-N junction, are connected as a load to respective outputs of said first differential amplifier means, said devices logarithmically converting output currents of said first differential amplifier means into input voltages for said second differential amplifier means.

3. A chrominance signal processing circuit according to claim 2; wherein said second differential amplifier means comprises a pair of differential amplifiers the output signals of which are supplied with the same phase to said phase control circuit means.

4. A chrominance signal processing circuit according to claim 3; wherein the current of said second constant current source is shared equally between said pair of differential amplifiers of the second differential amplifier means so that signals supplied to said phase control circuit means may have the same phase and the same level.

5. A chrominance signal processing circuit according to claim 3; wherein the current of said third constant current source is shared between said pair of differential amplifiers of the second differential amplifier means with a ratio controlled by said phase controlling means so that signals supplied to said phase control circuit means may have the same phase and differentially controlled levels.

6. A chrominance signal processing circuit according to claim 3; wherein said phase control circuit means includes a series circuit of a resistor and a capacitor, and said gain-controlled carrier signal and phase-controlled burst signal are obtained at a connection point between said resistor and capacitor.

7. A chrominance signal processing circuit according to claim 6; further comprising emitter-follower transistors through which the output signals of said second differential amplifiers means are supplied to said phase control circuit.

8. A chrominance signal processing circuit according to claim 1; further comprising output means for providing an output signal derived from said output signal of the first differential amplifier means, means for detecting said derived output signal and providing a corresponding detected output, and means responsive to said detected output for maintaining constant said output signal of the first differential amplifier means.

* * * * *